United States Patent
Nasir et al.

(10) Patent No.: US 12,505,226 B2
(45) Date of Patent: Dec. 23, 2025

(54) SYSTEMS AND METHODS FOR DETERMINING CHILDREN'S PRIVACY RISK OF AN APPLICATION

(71) Applicant: Pixalate, Inc., Palo Alto, CA (US)

(72) Inventors: Jalal Nasir, Plano, TX (US); Muhammad Amin Bandeali, Prosper, TX (US); Melwin James Poovakottu, Billerica, MA (US); Allison Lefrak, Bethesda, MD (US); TasHawn Smith, Los Angeles, CA (US)

( * ) Notice: Subject to any disclaimer, the term of this patent is extended or adjusted under 35 U.S.C. 154(b) by 185 days.

(21) Appl. No.: 18/178,186

(22) Filed: Mar. 3, 2023

(65) Prior Publication Data

US 2023/0281320 A1  Sep. 7, 2023

Related U.S. Application Data

(60) Provisional application No. 63/316,275, filed on Mar. 3, 2022.

(51) Int. Cl.
*G06F 21/57* (2013.01)
*H04L 9/40* (2022.01)

(52) U.S. Cl.
CPC .......... *G06F 21/577* (2013.01); *H04L 63/20* (2013.01); *G06F 2221/033* (2013.01)

(58) Field of Classification Search
CPC ............ G06F 21/577; G06F 2221/033; G06F 21/6245; H04L 63/20
See application file for complete search history.

(56) References Cited

U.S. PATENT DOCUMENTS

| | | | |
|---|---|---|---|
| 12,094,474 B1* | 9/2024 | Gowal | G10L 21/0232 |
| 2003/0221106 A1* | 11/2003 | Delp | G06T 1/0064 |
| | | | 348/E5.009 |
| 2008/0028435 A1* | 1/2008 | Strickland | G06Q 10/083 |
| | | | 726/1 |
| 2008/0047016 A1* | 2/2008 | Spoonamore | G06Q 10/06 |
| | | | 726/25 |
| 2011/0216936 A1* | 9/2011 | Reed | G06T 1/0021 |
| | | | 382/100 |

* cited by examiner

*Primary Examiner* — Abiy Getachew

(57) ABSTRACT

Non-limiting, non-exclusive aspects of the present disclosure relate to determining the user group to which an application is directed, and the level of user group privacy risks associated with the application. In particular, the disclosed technology receives, detects and processes application information, determines if the application is directed at a group of users (e.g., children), and, if the application is indeed directed at the target user group, the disclosed technology generates a user group privacy risk level derived from application information signals. Application information signals may include a determination of whether the application requires permissions that enable access to or capture of personal information from or related to the application's users such as residential end-user IP address or precise location information. The privacy risk assessment may be based on signals associated with applicable privacy regulations (e.g., the rule implementing the Children's Online Privacy Protection Act (COPPA)).

20 Claims, 7 Drawing Sheets

| Permission Name 202 | Description 204 | Sensitive Data Indicator Index 206 |
|---|---|---|
| Camera | Allows Application To Take Video | (*8) |
| Callphone | Allows Application to Make Phone Calls | (*5,7,8) |
| Add_voicemail | Allows Application To Have Access to Voicemail | (*5,7,8) |
| Read_calendar | Allows Application Access to your Calendar and Data within Calendar | (*1,2,3) |
| Read_call_log | Allows Application Access to your Call Logs | (*5) |
| Read_contacts | Allows Application Access to Your Contacts and information included (PII) | (*1,2,3) |
| Access_fine_location | Allows Application Access to GPS coordinates | (*2,9,10) |
| Access_background_location | Allows Application Access to your location as it operates in the background | (*2,9,10) |

List of Advisories associated with target groups:

- 12+
- 4+
- 9+
- All ages
- Everyone
- Everyone 10+
- General
- Parental Guidance
- PEGI 12
- PEGI 3
- PEGI 7
- Rated for 12+
- Rated for 3+
- Rated for 7+
- USK: Ages 12+
- USK: Ages 6+
- USK: All ages

| Targets Kids 402 | Privacy Policy 404 | Data Permission 406 | Residential IP Traffic 408 | Transmits Location 410 | Risk Level 412 | Reason 414 |
|---|---|---|---|---|---|---|
| No | n/a | No | n/a | n/a | low | There is no identifiable COPPA RISK |
| Yes | No | No | n/a | n/a | medium | Application Targets Kids and does not have permissions for personal information but does not have a private policy. |
| Yes | Yes | Yes | No | No | medium | Application Targets Kids. Not detected the passing of location data, and appropriately has a privacy policy, but has permissions for passing personal information |
| No | Yes | Yes | Yes | n/a | medium | Not targeting Kids, and has a privacy policy, but has permissions for personal information and passes IP data |
| No | Yes | Yes | n/a | Yes | medium | Not targeting Kids, and has a privacy policy, but has permissions for personal information and passes Location Data |
| Yes | No | Yes | n/a | n/a | high | Application target kids but has no private policy, and has permissions for passing personal information |
| Yes | Yes | Yes | Yes | n/a | high | Application targets kids but has a private policy but also has permissions for passing personal information and personal IP data is detected |
| Yes | Yes | Yes | n/a | Yes | high | Application targets kids and has a privacy policy but has permissions for passing personal information, and passed location information is detected |
| No | No | Yes | n/a | n/a | high | Application does not target kids but has no privacy policy, and has permissions for passing personal information |

FIG. 4A

| Targets Kids | Sensitive Permissions | Permissions | Location Permissions | Privacy Policy | Impact to COPPA Compliance Risk 420 | Risk Explanation |
|---|---|---|---|---|---|---|
| No | Yes | Yes or No | Yes or No | Yes or No | Low | There is a low COPPA RISK because the app is likely not directed to children. |
| Yes | No | Yes | Yes or No | Yes or No | High | App Targets Kids and does not have permissions for personal information and does not have a private policy. According to COPPA (16 CFR 312.4(d) §§§ ) apps targeting kids are required to have a privacy policy. |
| Yes | Yes | Yes | No | No | Medium | App Targets Kids, we do not detect the passing of location data, and appropriately has a privacy policy, but has permissions for passing personal information |
| Yes | Yes | Yes | Yes or No | Yes or No | High | App targets kids but has no private policy, and has permissions for passing personal information. App can be used by children under 13 and app can collect personal information using sensitive permissions |
| Yes | Yes | Yes | Yes | Yes or No | High | App targets kids and has a private policy, has permissions for passing personal information, and passed IP data is detected |
| Yes | No | Yes | Yes | Yes | High | App targets kids and has a private policy, has permissions for passing personal information, and but app passing location information is detected |
| Yes | No | Yes or No | Yes | Yes | High | App targets kids and has a privacy policy, does NOT have permissions for passing personal information, and but app passing personal IP data is detected |
| Yes | Yes | No | No | No | Medium | App likely targets kids under 13 but does not have sensitive permissions. The app has a privacy policy. |

FIG. 4B

SYSTEMS AND METHODS FOR DETERMINING CHILDREN'S PRIVACY RISK OF AN APPLICATION

CROSS-REFERENCE TO RELATED APPLICATION

This application claims priority to U.S. Provisional Application No. 63/316,275, titled "Systems and Methods for Determining a Level of User Privacy Risk for an Application," filed on Mach 3, 2022, the entire disclosures of which are hereby incorporated by reference in their entirety.

TECHNICAL FIELD

The present disclosure relates generally to determining a level of privacy risk for an application on internet-connected end user systems (e.g., connected televisions) or devices (e.g., smartphones) and, more particularly, the present disclosure relates to accurately determining whether an application is "child directed" and, if so, the level of privacy risk for children.

BACKGROUND

As use of smartphones, connected televisions (CTVs) and other internet-connected end user systems and devices has become common, protecting privacy of users, particularly of children, has become a primary concern. In response, a variety of policies and regulations have been enacted, and many more are currently under consideration globally, which define protected user groups (e.g., children) and restrict applications from collecting, using and disclosing information about or otherwise related to such groups absent compliance with applicable regulatory protections (e.g., unless prior parental notice and consent is obtained).

On most end user systems and devices, applications are required by the applicable operating system to obtain permission from the user in order to access or capture personal information associated with the user. In practice, the granting of such permissions creates additional risks of data disclosure and misuse. Using children's privacy as an example, an issue arises in accurately assessing a vast number of applications and determining (i) which applications are directed at children, and (ii) for each application determined to be child-directed, the level of privacy risk for child users of such application. The policies and regulations in various regions vary in levels of restricting the applications from collecting, using or disclosing information about children. Some applications indicate that children are not its target users but nonetheless collect, use or disclose personal information from users regardless of whether the user is a child. Thus, developing a technology that automatically and accurately identifies child-directed applications (inclusive of applications collecting, using or disclosing personal information from children despite claims that such applications are not directed at children), and for applications deemed child-directed determines a level of privacy risk for users of such applications, would be desirable.

It is with respect to these and other general considerations that embodiments have been described. Also, although relatively specific problems have been discussed, it should be understood that the embodiments should not be limited to solving the specific problems identified in the background.

SUMMARY

Non-limiting, non-exclusive aspects of the present disclosure relate to determining (i) the user group to which an application is directed, and (ii) the level of user group privacy risks associated with the application. In particular, the disclosed technology receives, detects and processes application information, determines if the application is directed at a group of users (e.g., children), and, if the application is indeed directed at the target user group, the disclosed technology generates a user group privacy risk level (e.g., low, medium, or high) derived from application information signals. Application information signals may include a determination of whether the application requires permissions that enable access to or capture of personal information from or related to the application's users such as residential end-user IP address (e.g., a persistent identifier) or precise location information (e.g., latitude and longitude; or city, street name and house number). In some aspects, the privacy risk assessment may be based on signals associated with applicable privacy regulations (e.g., the rule implementing the Children's Online Privacy Protection Act (COPPA), known as the COPPA Rule). In this aspect, additional signals may be used to derive a user group privacy risk level when the group of users is children, including, but not limited to, whether the application has a detectable privacy policy, as required under the COPPA Rule for websites or online services (e.g., applications) that are directed to children under thirteen years of age.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 2 illustrates exemplar permissions and data associated with respective permissions in accordance with aspects of the present disclosure.

FIG. 3 illustrates an example list of target user group advisories in accordance with aspects of the present disclosure.

FIG. 4a illustrates a first example list of privacy risk levels of applications in accordance with aspects of the present disclosure.

FIG. 4b illustrates a second example list of privacy risk levels of applications in accordance with aspects of the present disclosure.

DETAILED DESCRIPTION

Figure 1:
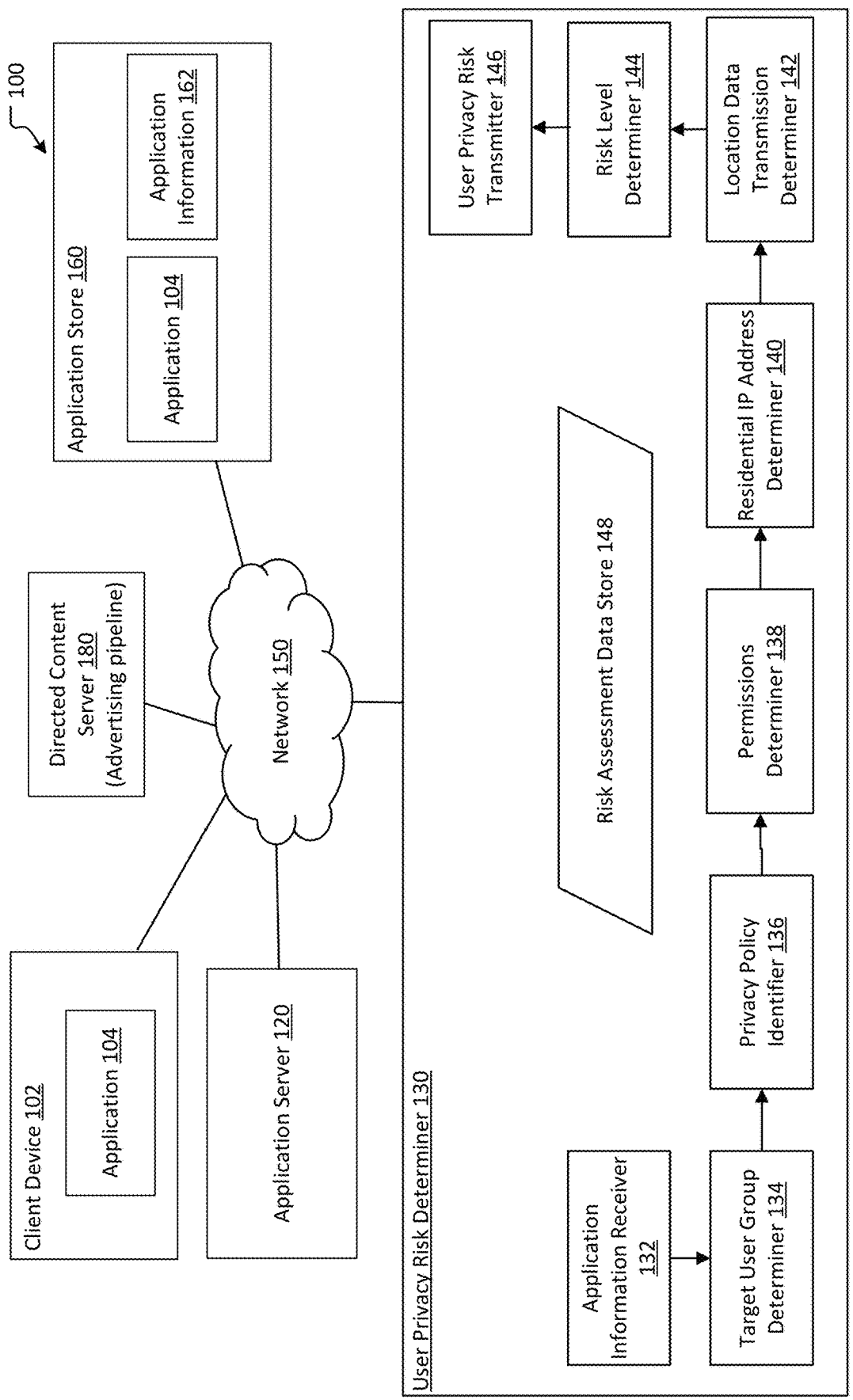
FIG. 1 illustrates an example system for determining whether applications are directed at a certain group of users, and, for applications that are directed at such users, a level of privacy risks for the target user group associated with such applications in accordance with aspects of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

Although the term "block" may be used herein to connote different elements illustratively employed, the term should not be interpreted as implying any requirement of, or particular order among or between, various steps disclosed herein unless and except when explicitly referring to the order of individual steps. Additionally, a "set" or "group" of items (e.g., inputs, algorithms, data values, etc.) may include one or more items, and, similarly, a subset or subgroup of items may include one or more items.

In aspects, the term "data collection" refers to gathering personal information related to an application user by means including but not limited to: requesting, prompting, or encouraging a user to input personal information; enabling the user to permit making personal information publicly available in an identifiable form (unless reasonable measures are taken to delete all or virtually all such personal information from a user's postings before they are made public and also delete such information from the operator's records); and/or passive tracking of a user online through one or more persistent identifiers. If the target users are children, the COPPA Rule imposes additional requirements on operators of websites or online services (e.g., applications) directed to children under thirteen years of age. The regulation further applies to operators of other websites or online services (e.g., applications) that have actual knowledge that they are collecting personal information online from children under thirteen years of age. The COPPA Rule applies to persons under U.S. jurisdiction under thirteen years of age, including children outside the United States. In aspects, the disclosed technology determines whether an application targets a user group, and, if so, a level of privacy risk for such target user group based on a combination of signals derived from application information. If the target users are children, the disclosed technology determines, for child-directed applications, a level of child privacy risk based on a combination of signals derived from application information in conjunction with applicable legal requirements (e.g., the COPPA Rule). The term "privacy risk" refers to a risk associated with violating privacy of a user by collecting, using or disclosing the user's personal information. The term "child-directed" refers to websites or online services (e.g., applications) directed to "children," as such term is defined under applicable privacy law, as well as operators of websites or online services (e.g., applications) that have actual knowledge that they are collecting personal information online from "children" (once again, as such term is defined under applicable law; e.g., with respect to the COPPA Rule, application users under thirteen years of age would meet the definition of children). The term "child privacy risk" refers to a risk associated with violating privacy of a child by collecting, using or disclosing personal information about the child in a way that violates applicable privacy law (e.g., COPPA). For example, when an application targets children, if the application has user device operating system-level permissions sufficient to take a photo of a child user with the camera feature of the system or device upon which the application is running, and the application collects, uses or discloses the photo without prior notice to and consent from a parent or guardian of the child, the application is in violation of the COPPA Rule. In this case, the disclosed technology would automatically determine the application as being child-directed and having a high level of child privacy risk based on the identified signal of collecting, using or disclosing the photo by the application.

In some other aspects, an application directed at children under a predetermined age (e.g., thirteen years old, sixteen years old, etc.) is required to obtain a parental consent before collecting personal information about the child user. Similarly to the U.S., the European Union (EU) has established data protection rules for children in article 8 of the General Data Protection Regulation (GDPR), which is also known as GDPR-K. GDPR-K requires applications or sites directed at children under 16 years of age (or younger depending on the EU country) to obtain verifiable parental consent before collecting, using or disclosing any personal information about the child. In certain embodiments, the disclosed technology can be used in the EU—as well as other jurisdictions that have adopted similar privacy frameworks, such as the United Kingdom and Switzerland—with adjustment made for definitional differences in the protected age range as required by applicable law.

In aspects, examples of personal information or sensitive information include one or more of the following: first and last name, home or other physical address including street name and name of a city or town, online contact information, screen or other user name that represent online contact information, telephone number, social security number, persistent identifiers that can be used to recognize a user over time and across different websites or online services including a customer number held in a cookie, an internet protocol (IP) address, a processor or device serial number, or unique device identifier; photograph, video or audio file, where such a file contains a user's image or voice, geolocation information including latitude and longitude or GPS coordinates sufficient to identify street name and name of a city or town, and information concerning the user or if the user is a child the parents of that child that the operator collects online from the user and combines with an identifier as described.

As discussed in more detail below, the present disclosure relates to determining a level of user privacy risk of applications, particularly with respect to the privacy of children, without determining if an actual violation of privacy has occurred in a specific case. In aspects, the disclosed technology determines a level of privacy risks of applications based on various signals. The levels of privacy risk can be derived with varying degrees of specificity, for example low, medium, and high risk.

FIG. 1 illustrates an overview of an example system 100 for determining a user privacy risk of an application in accordance with aspects of the present disclosure. System 100 represents a system using an application and information associated with the application for determining a user's privacy risk. System 100 includes a user device 102, an application server 120, a user privacy risk determiner 130, an application store 160, and a directed content server 180 (advertising pipeline). A network 150 connects the respective parts of the system 100.

The user device 102 includes an application 104. Users of the user device 102 may use the application 104 to access the application server 120 over the network 150. The user device 102 downloads the application 104 from the application store 160. Additionally, or alternatively, the user device 102 may download other applications (e.g., CTV applications or mobile applications) from the application store 160. The application 104 may communicate with the application server 120 to receive content and transmit user input. The application 104 and/or the application server 120 may communicate with the directed content server 180. The application 104 and/or the application server 120 may receive directed content (e.g., digital advertising content) for rendering the direct content to the user of the user device 102.

The directed content server 180 provides directed content (e.g., digital advertising content) to user systems or devices through applications. In aspects, the directed content server 180 includes an advertising pipeline, which determines directed content for respective applications as the user uses the application 104 on user devices and transmits the directed content to the application 104. The directed content server 180 may store digital advertising content, each associated with an advertiser, in a database (not shown). In some aspects, the advertising pipeline includes receiving IP addresses of the user devices where the application 104 executes. In some aspects, the IP addresses of the user devices may include residential IP addresses, which indicates that the user devices are in use at a residence. In contrast to a public place where use of the user devices are in public, a residential IP address may indicate a higher granularity of a location than an IP address associated with a public place. In aspects, the disclosed technology determines a higher risk to user privacy when an IP address of the application is a residential IP address because the user device with a residential IP address may be locatable at a higher granularity than the user devices with non-residential IP addresses (e.g., at a public place).

The user privacy risk determiner 130 determines a level of child privacy risk for applications. The derived level of risk may not be an indicator of actual violation of user privacy by the application, rather it may signify that a user's privacy could be violated. In aspects, the user privacy risk determiner 130 determines a level of target group user privacy risk for applications in the application store 160. The user privacy risk determiner 130 includes an application information receiver 132, a target user group determiner 134, a privacy policy identifier 136, a permissions determiner 138, a residential Internet Protocol (IP) address determiner 140, a location data transmission determiner 143, a risk level determiner 144, a user privacy risk transmitter 146, and a risk assessment data store 148.

In aspects, the user privacy risk determiner 130 determines whether the application's developer has taken actions that reflect industry best practices on protecting user privacy. Additionally, or alternatively, the user privacy risk determiner 130 determines whether the application complies with industry best practices for protecting the user privacy or if the application needs modification to achieve compliance.

Additionally, or alternatively, the user privacy risk determiner 130 may include an application discovery option as an initial feature. The application discovery option applies include and/or exclude criteria at the outset to narrow the field of potential applications. An include criteria searches for user-defined terms in the title, description or privacy policy of applications and includes the applications with the user-defined words for risk analysis. Conversely, an exclude criteria searches for user-defined terms in the title, description or privacy policy of applications and filters out these applications from the results set. The user-defined terms may define a general category, like kid, butterfly or gun, which will return more results from the title and description of an application. However, specific user-defined terms like GDPR, COPPA, and CCPA will specifically target the privacy policy of an application. The application discovery option may have a single user-defined term or multiple user-defined terms for each operation. In certain aspects, only include or exclude criteria will be selected or both include and exclude criteria will be selected.

Additionally, or alternatively, the user privacy risk determiner 130 may include an application risk assessment option where specific applications are input to determine their risk level. In this aspect, a determination of risk is made only for the included application. Multiple applications may be input at the same time.

The disclosed technology determines a level of risks associated with protecting private information associated with a target group of users, such as children. For example, the user privacy risk determiner 130 determines multiple signals associated with a publisher of the application and produces a risk level (e.g., low, medium, or high). The risk level assesses whether a given application publisher is complying with all applicable user privacy guidance and regulations (e.g., the COPPA Rule; and the California Consumer Privacy Act (CCPA), as amended and extended by the California Privacy Rights Act (CPRA)). For example, if the target group of users is children, one or more of the following signals could be used independently or in combination to determine a risk level: (i) is the application directed to children under a specified age?; (ii) is a privacy policy detectable for a given application?; (iii) does the detected privacy policy (as applicable) contain specific disclosures required by applicable law; (iv) does the application require permissions that could potentially allow for the collection, use or disclosure of personal information of children (as described above)?; (v) does the application expose GPS coordinates that correspond to granular information about the user's location (e.g., precise within a geographic area that is equal to or less than the area of a circle with a given radius, for example as prescribed by the CPRA)?; (vi) does the application collect, use or disclose residential end-user IP address (e.g., as disclosed or detected through the digital advertising pipeline) which exposes granular information about the user's location (e.g., a residential IP address can provide more location granularity than a cellular IP)? If the application does not include a detectable privacy policy and it is directed at children under the age of thirteen, the application may fail to comply with applicable law. In the absence of a detectable privacy policy statement or indication, consumers may be deprived of means to understand the application's potential uses of personal information of all potential users, including children under thirteen years of age.

The application information receiver 132 receives information about an application 104 from the application store 160. The information about the application 104 is associated with the application information 162 in the application store 160. For example, the application information 162 may include a target user group of the application 104, a status of a successful detection of a privacy policy associated with the application 104, whether the application 104 is in the games, family, kids, education or similar category on the applicable application store 160, if the application 104 is part of a specially designated application store 160 or similar program directed at children, if the application 104 has an application store 160 age rating at or below a specified target age, or if key words from the application's 104 title or description on the applicable application store 160 suggest that it is child-directed. Additionally, or alternatively, the application information receiver 132 may receive the information about the application 104 from the application server 120. For example, the application server 120 may provide information including an IP address of the user device 102 while in use and location data of the user device 102 with the application 104 as transmitted by the application 104. The application information receiver 132 may receive the IP address of the application 104 installed in the user device 102 from the directed content server 180 (the advertising pipeline).

In aspects, the application information receiver 132 may receive the application information associated with the application 104 installed and in use at a plurality of user devices including the user device 102. Additionally, or alternatively, the application information receiver 132 may receive statistical information about the application 104 from the application store 160 and/or the application server 120 over the network 150. In some aspects, the application information 162 may include one or more of the following: a subject matter of the application 104 (e.g., storytelling), visual and audio content, the use of animated characters or other child-oriented activities and incentives, the age of models, the presence of child celebrities or celebrities who appeal to kids, digital advertising on the application 104 that is directed to children, information contained in the application's 104 title and description, a target age group of the application 104, a status of a detectable privacy policy associated with the application 104, whether the application 104 is in the games, family, kids, education or similar category, if the application 104 is part of a specially designated program directed at children, if the application 104 has an age rating at or below a specified target age, and other evidence about the age of the application's 104 actual or intended audience.

The target user group determiner 134 determines a target user group of the application 104 derived from the application information 162. The application information 162 may include descriptions of the target user group of the application 104 (e.g., intended for use by children under thirteen years of age) as described above. The target user group determiner 134 stores a result of the determining in the risk assessment data store 148 in memory that is shared among parts of the user privacy risk determiner 130. The risk assessment data store 148 includes a table of results of assessing a plurality of aspects of risk signals associated with a child privacy risk of the application 104. To better derive the target user group from the application information 162 a keyword and key term list is compared to the text of the application 104 title and description. The keyword and key term list is a set of contextual signals including commonly used words and phrases for application's that are directed toward the target user group. The set of words and phrases within the keyword and key term list can be further refined to include important words and terms and unimportant words and terms. Important keywords and key terms indicate a high probability of being directed towards the target user group. Unimportant keywords and key terms indicate a high probability of not being directed towards the target user group. If the target user group is children, examples of important keywords and key terms include generic words and terms such as children, kids, child, all ages, educational, preschool, kid friendly, family friendly, parent approved, bubbles and toddlers as well as more specific words and terms associated with popular children's characters, programs, children's content and media providers typically associated with children's programming. Unimportant keywords and key terms can include a variety of generic words which are targeted towards different groups like advanced, office, examination, complex, dating and shopping. Unimportant keywords could also be prepositions (e.g., "with," "at," "from," "into," etc.) or conjunctions (e.g., "also," "and," "is," "or," etc.) that indicate little to no probabilistic value in determining a target user group. Examples are provided herein with respect to a keyword and key term list. It will be appreciated by one having skill in the art that one or more words and/or combinations of words may be used, such that the disclosed aspects may similarly be applicable to a keyword list or a key term list among other examples.

The keyword and key terms list is applied in a probabilistic manner utilizing analysis methods such as term frequency-inverse document frequency (TF-IDF"). Over a high number of iterations, the presence or absence of keywords and key terms signals a probabilistic likelihood that an application is or is not targeted at a user group. Higher accuracy is achieved by applying the keywords as combinations of two or more words or as phrases. For example, if the target user group is children the presence of the important keyword "ages" would indicate some probability of the application being targeted at children. Conversely, the presence of the word "all" has a high probability of not being targeted at children or indicating little probabilistic value. Modifying the criteria to "all ages" indicates a high probability of being targeted to children. As such, an n-gram approach may be employed in which an N-word phrase can be accounted for in the analysis.

Additionally, or alternatively, the target user group determiner 134 may further include image analysis. By reviewing images associated with application information 162, applications that do not appear to be directed at a target user group based upon application self-categorization and/or keyword analysis may nonetheless be deemed directed at a target user group based on image analysis. For example, if the target user group is children an image of a smiling sun with rainbows may indicate that the application is directed towards children.

To improve accuracy and limit false positives by the target user group determiner 134, two training methods may be employed. First, supervised training is performed on the keyword and key term list to account for semantic context. Over multiple iterations, semantic context is embedded within the keyword and key term list to account for common words with multiple meanings. For example, supervised training clarifies the semantic context differences associated with the word kid which can mean a child, a goat, or a joke.

In another aspect the supervised training would clarify that a butterfly can mean an insect, a swimming stroke or a type of bandage. Second, a known set of applications directed at a target user group (e.g. children) is developed and verified via supervised training iterations. Once the curated list is defined, common content within the titles and descriptions of the applications is identified and fed back into the system. A machine learning algorithm is then used to identify other applications with similar word occurrence patterns which are then fed back into the system. This process is repeated for a high number of iterations, until the result sets start having low levels of false positives and/or false negatives and the result sets begin to change less and less significantly.

In an aspect, the target user group determiner 134 may determine that an application 104 is targeting a user group of children if any of the collected application information singularly or in combination meets any one or more of a specified set of targeting conditions including (i) if the application is in a games, family, kids, children or education category; (ii) the age rating provided in the application 104 is below the target age range for children; (iii) the application 104 is part of a specially designated program directed at children; (iv) the application 104 title or description contains words or terms from the keyword and key term list; and (v) the application 104 has been determined to be targeted at children on a different operating system. For example, an application 104 would be considered to target children if the application 104 is in a game's category, have an age rating below the target age, and the application title contained a word like kids from the keywords and key term list. In another example, if an application has been determined to target children on one operating system platform, if the same application is available on another operating system the application would be determined to target children on that operating system as well.

The privacy policy identifier 136 identifies a registration of privacy policy information based on the application information associated with the application 104. In aspects, if the application does not have a detectable privacy policy, then a level of user privacy risk associated with the application 104 may rise. In some of these aspects, the application 104 may fail to comply with applicable law (e.g., due to absence of: (i) consumer contact mechanisms, or (ii) disclosures relating to children's privacy protection, consumer choice and rights, data sharing, specific data elements collected, used or disclosed, and/or purpose for collection of such data elements). In some other aspects, consumers may be deprived of a key means to understand the application's 104 potential uses of personal information of all potential users, including children under thirteen years of age. The privacy policy identifier 136 stores a result of the identifying in the risk assessment data store 148.

The permissions determiner 138 determines one or more permissions that the application 104 requests in the user device 102 for enabling use of the application 104. For example, the application 104 may request access to location services, access to the contact list, installed camera or microphone, saved images, and the like on the user device 102. In many cases, not all the requested permissions are used by the application 104, and very often, many permissions requested might not even be needed for the normal operation of the application (e.g., GPS coordinates might be necessary for a weather application, but not for a drawing application for kids). However, the fact that access to certain permissions has been granted (even if not used) creates additional privacy risks because the permission can be used at any time in the future. The permissions determiner 138 stores a result of the determining in the risk assessment data store 148.

The residential IP address determiner 140 determines if the application 104 accesses the user device's IP address, and, if so, whether the IP address is reserved for use at residences. In aspects, the application 104 that accesses users' IP addresses, where certain of such IP addresses are reserved for use at residences, may have a higher privacy risk level than applications where solely public IP addresses are detected, because of a higher likelihood that the user (e.g., a child) may use the application 104 at home with a higher expected level of privacy. In aspects, the residential IP address determiner 140 may receive the IP address in the application information. The residential IP address determiner 140 stores a result of the determining in the risk assessment data store 148.

In aspects, the location data transmission determiner 142 determines whether the application 104 collects, uses or discloses location data. Location data may include Global Positioning System (GPS) data (e.g., latitude and longitude), reverse geo-IP lookup location data (i.e., approximate locations derived from geolocation databases, which often include continent, country, state/region, city, and/or time zone of the electronic device), or city, street name and/or house number associated with the user device 102. The location data transmission determiner 142 may determine the collection, use or disclosure based on the permission information associated with the application 104. Additionally, or alternatively, the location data transmission determiner 142 determines the collection, use or disclosure based on information from the application server 120 and the directed content server 180. In some aspects, the digital advertising pipeline may use the location information of the application 104 for determining digital advertising. The location data transmission determiner 142 stores a result of the determining in the risk assessment data store 148.

The risk level determiner 144 determines a user privacy risk level associated with the application 104 without determining if a specific violation of privacy occurred. The risk level determiner 144 compares a combination of signal values from the risk assessment data store 148 and determines the level of risk based on a predetermined set of rules. The levels of privacy risk can be derived with varying degrees of specificity. In aspects, the level of risk may include one of low, medium, or high. The predetermined set of rules may establish a risk level based on a predetermined combination of signals relating to the application 104. One or more of the following signals could be used independently or in combination to determine a risk level: (i) is the application directed to children under the target age?; (ii) does the application have a detectable privacy policy?; (iii) does the privacy policy contain specific disclosures required by applicable law, such as the COPPA Rule or the CCPA, as amended and extended by the CPRA; (iv) does the application require permissions that could potentially allow for the collection, use or disclosure of personal information of children (as described above)?; (v) does the application expose GPS coordinates that correspond to granular information about the user's location?; (vi) does the application collect, use or disclose residential end-user IP address (disclosed or detected through the advertising pipeline) which exposes granular information about the user's location (e.g., a residential IP address can provide more location granularity than a cellular IP). The level of risk is then determined by the risk level determiner 144 by comparing the actual combination of signal values to the predetermined set of rules and assigning the risk level that corresponds to the rules. For example, the level of risk is low when information associated with the application 104 indicates a combination of: not directed to children, no privacy policy detected, and asking for permission to access various restricted data—or applicable device functionality to capture such data—in the user device. In another aspect, a combination of signals where the risk level determiner 144 would determine the level of risk is high includes: the application is directed to children, has a detectable privacy policy, the detected privacy policy contains specific disclosures required by applicable law, has permissions for accessing, capturing, using or disclosing personal information relating to the device's user, and has permissions for accessing, detecting or disclosing location information regarding such user.

The user privacy risk transmitter 146 transmits the determined level of privacy risk over the network 150. In aspects, the user privacy risk transmitter 146 transmits the level of risk to the application server 120. Additionally, or alternatively, the user privacy risk transmitter 146 transmits the level of risk to the application store 160 for alerting device users about the risk. The indication of the risk may prevent children and/or parents or guardians of the children from inadvertently downloading an application with a high level of child privacy risk.

In aspects, the user privacy risk determiner 130 may execute the above detailed operations in sequence. Additionally, or alternatively, some of the above detailed operations may take place concurrently based on the received application information and the statistical information about the application. In aspects, the risk assessment data store 148 includes a memory access controller (not shown). The memory access controller maintains integrity of the status values of respective privacy risk signals. The controller controls concurrent access by the multiple operations in the user privacy risk determiner 130. In aspects, the privacy risk signals may include one or more of a target user group, whether the application includes a detectable privacy policy, whether the detected privacy policy contains specific disclosures required by applicable law, whether the application requests one or more permissions to access and/or capture personally identifying information, whether the application enables access to and/or capture of a user's residential IP address, and whether the application enables access to and/or capture of user location data.

As will be appreciated, the various methods, devices, applications, features, etc., described with respect to FIG. 1 are not intended to limit the system to being performed by the particular applications and features described. Accordingly, additional controller configurations may be used to practice the methods and systems herein and/or features and applications described may be excluded without departing from the methods and systems disclosed herein.

FIG. 2 illustrates an example of permissions and a level of risk to expose sensitive data in accordance with aspects of the present disclosure. In aspects, applications request access to certain device permissions in order to operate, such as access to location services, access to the user's contact list, etc. In aspects, not all the permissions are used by the application that requests access to them. In some aspects, some of the permissions may be unused by the application for its normal operation (e.g., GPS coordinates might be necessary for a weather application, but not for a drawing application for kids). However, access to certain permissions being granted (even if not used) creates additional risks because the permission can be used at any time in the future.

A table 300 includes names and descriptions of device operating system-level permissions associated with an application, and indices associated with risks. Permission name 202 indicates a name of a permission that the end user device's operating system allows upon request by the application. Description 204 describes the permission. Sensitive indicator index 206 describes an index that indicates sensitivity of the permission with respect to user privacy. The sensitive indicator index 206 may relate to a level of risk to expose sensitive data of a user. For example, a permission "Camera" "[a]llows Application to Take Video" with a sensitive indicator index of 8.

FIG. 3 illustrates an example of a list of advisories associated with target user groups in accordance with aspects of the present disclosure. In aspects, the table 300 includes a list of advisories. The advisories include: 12+ years old, 4+ years old, 9+ years old, All ages, Everyone, Everyone 10+ years old, General, Parental Guidance, PEGI 12, PEGI 3, PEGI 7, Rated for 12+ years old, Rated for 3+ years old, Rated for 7+ years old, USK: Ages 12+ USK: Ages 6+, and USK: All ages. In aspects, an advisory indicates a target user group of an application. For example, an application with an advisory of Rated for 3+ years old indicate that the application is intended for use by a user who is greater than or equal to three years old. The disclosed technology reads a target user group (or advisories) associated with an application from its application information in the application store 160.

FIG. 4a illustrates an example of combinations of signals associated with a level of privacy risk where the target users are children in accordance with aspects of the present disclosure. The table 400 includes whether the application targets kids 402, including privacy policy detection 404, data permission 406, residential IP traffic detection 408, transmitting location information 410, risk level 412, and reason 414. A combination of values associated with respective signals corresponds to a level of child privacy risk. For example, an application having no indication of kids as its target users, no posting of a privacy policy, and there is no required permission for passing personal information is at a high level of child privacy risk. In some other aspects, an application includes an indication of children as target users, includes a posting of a privacy policy, requests permission for passing personal information, and detects data traffic from a residential IP is also high in the child privacy risk. Other example combinations are set forth in FIG. 4a.

FIG. 4b illustrates a second example of combinations of signals associated with a level of privacy risk where the target users are children in accordance with aspects of the present disclosure. The table 420 includes information related to whether the application is directed to children 422, has a detectable privacy policy 424, sensitive data permission 426, residential IP traffic 428, passes location 430, impact to COPPA Rule compliance risk 432, and reason 434. A combination of values associated with respective signals corresponds to a level of child privacy risk. For example, if an application is not directed to children, regardless of other signals, the risk is low. In some other aspects, if the application is directed at children, doesn't have a detectable privacy policy, doesn't have permission to access and/or capture sensitive data, and may or may not collect, use or disclose users' residential IP address and/or geographic location, the risk is high. Other example combinations are set forth in FIG. 4b.

In practice, some applications may be directed to a general user audience, while characteristics associated with the application may make it likely that it collects, uses or discloses personal information from children under thirteen years of age. For example, the following characteristics may make it likely that an application captures personal information of children: the subject matter of an application, visual and audio content of the application, the use of animated characters or other child-oriented activities and incentives by the application, the age of models included in the application, the presence of child celebrities or celebrities who appeal to children in the application, ads on the application that are directed to children, and other reliable evidence about the age of the actual or intended audience. Thus, even though an application developer may claim that an application is "not directed to children under thirteen years of age," a child could still be at risk of being tracked due to the passing of data such as "geolocation information sufficient to identify a street name and city or town." To account for these characteristics, a keyword list of contextual signals relating to an application's title or description is used to verify an application developer's categorization. The keyword list includes child-related keywords, which can be found in the application's title or description. The keyword list includes a combination of generic words such as children, kids, child, all ages, educational, preschool and toddlers, as well as more specific words associated with popular children's characters, programs, children's content and media providers typically associated with children's programming.

Figure 5:
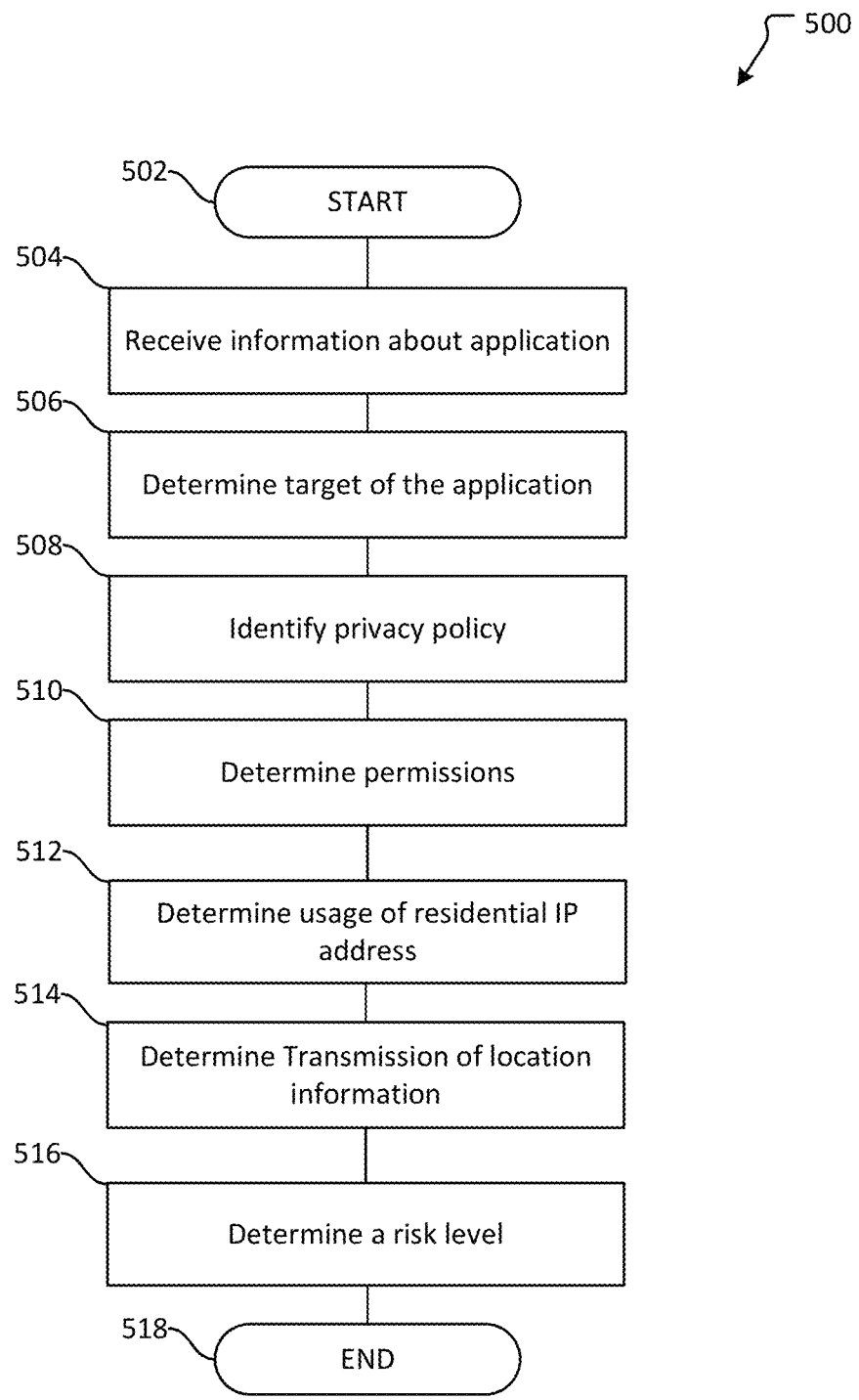
FIG. 5 illustrates an example method of determining a level of privacy risk for target users associated with different applications in accordance with aspects of the present disclosure.

FIG. 5 is an example of a method for determining a level of user privacy risk for an application (e.g., a CTV or mobile application) in accordance with aspects of the present disclosure. A general order of the operations for the method 500 is shown in FIG. 5. Generally, the method 500 begins with start operation 502 and ends with end operation 518. The method 500 may include more or fewer steps or may arrange the order of the steps differently than those shown in FIG. 5. The method 500 can be executed as computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2, 3, 4a, 4b and 6.

Following the start operation 502, the method 500 begins with receive operation 504, which receives information about an application. In aspects, the receive operation 504 receives the information from an application store (e.g., application store 160). Additionally, or alternatively, the receive operation 504 receives an IP address of the application from an advertising pipeline in a directed content server. The advertising pipeline may include IP addresses of user devices as destinations of transmitting directed content (e.g., digital advertising).

Additionally, or alternatively, the receive operation 504 may include an application discovery option as an initial feature. The application discovery option applies include and/or exclude criteria at the outset of the method. An include criteria searches for user-defined terms in the title, description or privacy policy of applications and includes the applications with the user-defined words for risk analysis. Conversely, an exclude criteria searches for user-defined terms in the title, description or privacy policy of applications and filters out these applications from the results set. The user-defined terms may define a general category, like kid, butterfly or gun, which will return more results from the title and description of an application. However, specific user-defined terms like GDPR, COPPA, and CCPA (i.e., in reference to the California Consumer Privacy Act of 2018), will specifically target the privacy policy of an application. The application discovery option may have a single user-defined term or multiple user-defined terms for each operation. In certain aspects, only include or exclude criteria will be selected or both include and exclude criteria will be selected.

Additionally, or alternatively, the receive operation 504 may include an application risk assessment option where specific applications are input to determine their risk level. In this aspect, a determination of risk is made only for the included application. Multiple applications may be input at the same time.

Determine operation 506 determines a target user group of the application. The target may include an age group. For example, the target may be three years old and older. In aspects, the determine operation 506 determines a status value that indicates whether the target user group includes children.

Identify operation 508 identifies a privacy policy posted for the application. In aspects, an application store (e.g., an application store 160 in FIG. 1) may store a privacy policy for an application. The identify operation 508 may determine a status value that indicates whether the application includes a detectable privacy policy.

Determine operation 510 determines permissions for the application. In aspects, the permissions include a permission (e.g., permission name 202 in FIG. 2) for accessing and using personal information. The application may interactively set the permission through user interface. The determine operation 510 may determine a status value that indicates whether the application requests one or more permissions.

Determine operation 512 determines usage of a residential IP address. In aspects, the determine operation 512 identifies the residential IP address by looking up the IP address of the application. The determine operation 512 may determine a status value that indicates whether the application uses a residential IP address. Determine operation 514 determines whether the application transmits location information regarding the application's user to a network. The determine operation 514 may determine a status value that indicates whether the application transmits location data. Determine operation 516 determines a level of user privacy risk based on a combination of status values associated with at least: a target user group, whether the application has a detectable privacy policy, whether the detected privacy policy (as applicable) contains specific disclosures required by applicable law, whether the application includes permissions that enable access to or capture of the user's personal information (e.g., residential IP address and/or location information). The method 500 ends with the end operation 518.

Figure 6:
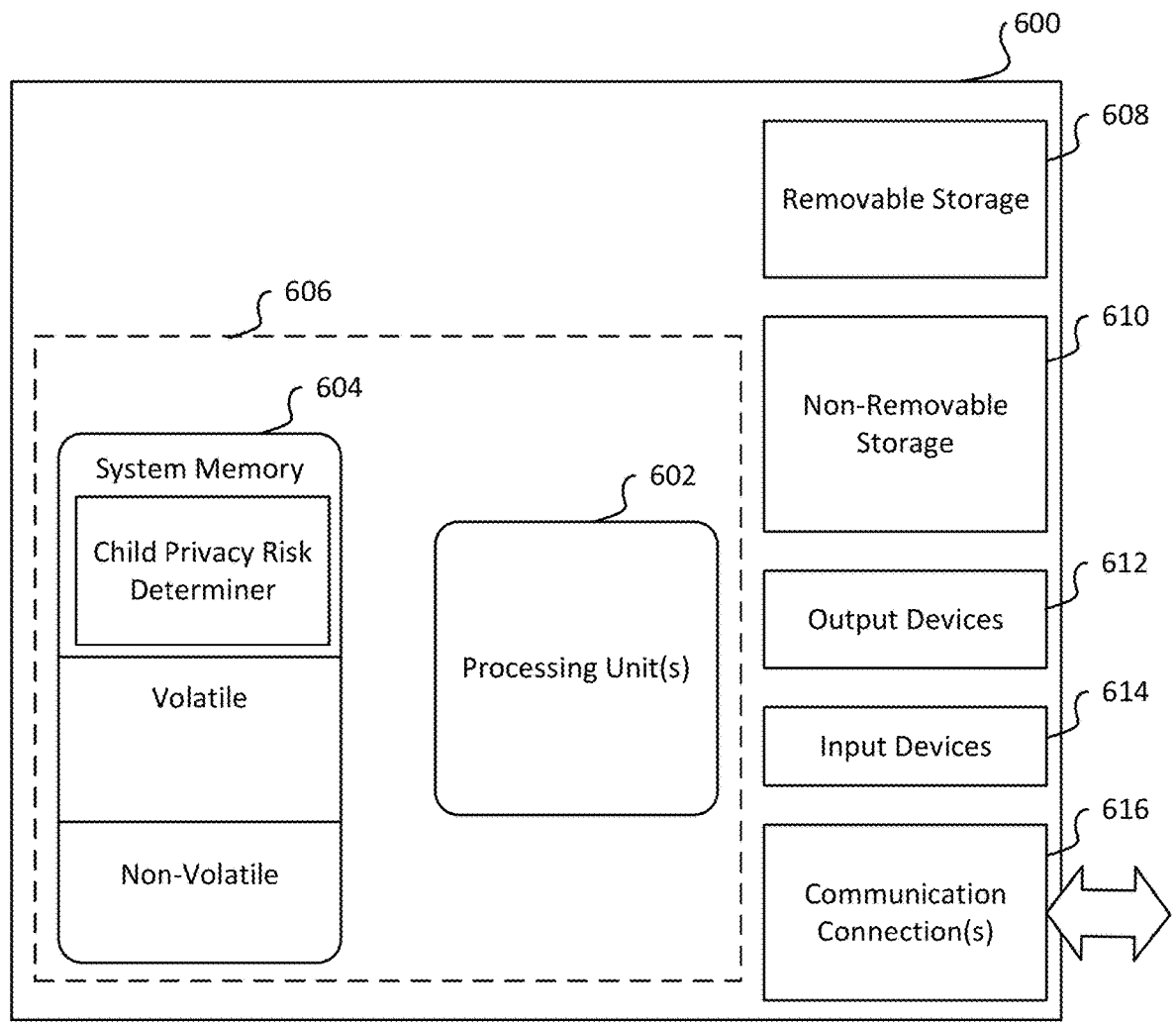
FIG. 6 illustrates a diagram of a computing system for implementing one or more of the embodiments in accordance with aspects of the present disclosure.

FIG. 6 illustrates a simplified block diagram of a device with which aspects of the present disclosure may be practiced in accordance with aspects of the present disclosure. The device may be a set top box (STB) and/or a mobile computing device, for example. One or more of the present embodiments may be implemented in an operating environment 600. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 600 typically includes at least one processing unit 602 and memory 604. Depending on the exact configuration and type of computing device, memory 604 (instructions to perform the embodiments as described herein) may be volatile (such as RAM), non-volatile (such as ROM, flash memory, etc.), or some combination of the two. This most basic configuration is illustrated in FIG. 6 by dashed line 606. Further, the operating environment 600 may also include storage devices (removable storage, 608, and/or non-removable storage 610) including, but not limited to, magnetic or optical disks or tape. In some aspects, the removable storage 608 includes a subscriber card (e.g., a smart card and a subscriber identification module (SIM) card). Similarly, the operating environment 600 may also have input device(s) 614 such as remote controller, keyboard, mouse, pen, voice input, onboard sensors, etc. and/or output device(s) 616 such as a display, speakers, printer, motors, etc. Also included in the environment may be one or more communication connections, 612, such as LAN, WAN, a near-field communications network, a cellular broadband network, point to point, etc.

Operating environment 600 typically includes at least some form of computer readable media. Computer readable media can be any available media that can be accessed by processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

According to certain embodiments, any of the one or more above aspects may be combined with any of the aspects described in U.S. patent application Ser. No. 16/865,563, entitled, "Server-Side Ad Insertion Proxy Fraud Detection System," and filed May 4, 2020, (Pixalate, applicant), the entire contents of which is incorporated herein by reference in its entirety for all purposes.

According to certain embodiments, any of the one or more above aspects may be combined with any of the aspects described in U.S. patent application Ser. No. 11/245,663, entitled, "Systems and Methods for Detecting the IPv4 Address and the IPv6 Address of a Purported End User Device Over a Network," and filed May 4, 2020, (Pixalate, assignee), the entire contents of which is incorporated herein by reference in its entirety for all purposes.

What is claimed is:

1. A system for determining a level of user privacy risk of an application, the system comprising:
   a processor; and
   memory including instructions which when executed by the processor, cause the processor to:
   receive information associated with an application;
   determine a target user associated with the application, wherein determining the target user group comprises:
     performing a keyword analysis by analyzing the semantic context of one or more keywords associated with the application and comparing the semantic context of the one or more keywords with the application to a plurality of keywords from a plurality of applications with known target audiences; and
     analyzing one or more images associated with the application to determine whether the images correspond to the keyword analysis;
   determine, based at least on the information, signal values associated with at least a part of a plurality of signals associated with the application, wherein the plurality of signals comprise one or more of:
     the target user group associated with the application,
     a detectable privacy policy associated with the application,
     a detected privacy policy containing specific disclosures required by applicable law,
     an access permission associated with the application,
     a use of a residential IP address associated with the application, or
     a transmission of location data by the application;

automatically determine, based on the signal values and a set of predetermined rules associated with user privacy risk levels, a level of user privacy risk associated with the application.

2. The system of claim 1, wherein the target user group includes users under thirteen years of age.

3. The system of claim 1, the method further comprising: receiving, from a digital advertising pipeline associated with the application, an IP address of the application.

4. The system of claim 1, wherein the information is received from an application store associated with the application.

5. The system of claim 1, wherein receiving information further comprising:
receiving one or more search terms;
discovering one or more applications based on the search terms; and
receiving information associated with the one or more discovered applications.

6. The system of claim 5, wherein discovering one or more applications further comprising:
receiving an include criteria for one or more include search terms;
discovering one or more applications with the one or more include search terms in the application's title, description, or privacy policy; and
receiving information associated with the one or more discovered applications that have the include search terms.

7. The system of claim 5, wherein discovering one or more applications further comprising:
receiving an exclude criteria for one or more exclude search terms;
discovering one or more applications with the one or more exclude search terms in the application's title, description, or privacy policy; and
filtering out the one or more discovered applications with the one or more exclude search terms.

8. The system of claim 1, wherein the set of predetermined rules associated with user privacy risk levels establishes a risk level based on a predetermined combination of signal values relating to an application.

9. A method for determining a level of user privacy risk of an application, the method comprising:
receiving information associated with an application;
determining a target user group associated with the application, wherein determining the target user group comprises:
performing a keyword analysis by analyzing the semantic context of one or more keywords associated with the application and comparing the semantic context of the one or more keywords with the application to a plurality of keywords from a plurality of applications with known target audiences; and
analyzing one or more images associated with the application to determine whether the images correspond to the keyword analysis;
determining, based at least on the information, signal values associated with at least a part of a plurality of signals associated with the application, wherein the plurality of signals comprise one or more of:
the target user group associated with the application,
a detectable privacy policy associated with the application,
a detected privacy policy containing specific disclosures required by applicable law,
an access permission associated with the application,
a use of a residential IP address associated with the application, or
a transmission of location data by the application;
automatically determining, based on the signal values and a set of predetermined rules associated with user privacy risk levels, a level of user privacy risk associated with the application.

10. The method of claim 9, wherein the target user group includes users under thirteen years of age.

11. The method of claim 9, the method further comprising:
receiving, from an advertising pipeline associated with the application, an IP address of the application.

12. The method of claim 9, wherein the information is received from an application store associated with the application.

13. The method of claim 9, wherein receiving information further comprising:
receiving one or more search terms;
discovering one or more applications based on the search terms; and
receiving information associated with the one or more discovered applications.

14. The method of claim 13, wherein discovering one or more applications further comprising:
receiving an include criteria for one or more include search terms;
discovering one or more applications with the one or more include search terms in the application's title, description, or privacy policy; and
receiving information associated with the one or more discovered applications that have the include search terms.

15. The method of claim 13, wherein discovering one or more applications further comprising:
receiving an exclude criteria for one or more exclude search terms;
discovering one or more applications with the one or more exclude search terms in the application's title, description, or privacy policy; and
filtering out the one or more discovered applications with the one or more exclude search terms.

16. The method of claim 9, wherein the set of predetermined rules associated with user privacy risk levels establishes a risk level based on a predetermined combination of signal values relating to an application.

17. A method for determining if an application targets children, the method comprising:
receiving information associated with an application, wherein the information about the application comprises:
a keyword analysis by analyzing a semantic context of one or more keywords associated with the application; and
an image analysis generated by analyzing one or more images associated with the application to determine whether the images correspond to the keyword analysis;
determining, based at least on the information, condition values associated with at least a part of a plurality of conditions associated with the application, wherein the plurality of conditions comprise one or more of:
the application is in a games, family, kids, children, or education category,
the age rating provided in the application is below the target age range for children, the application's title or description contains words from a keyword list, the application is part of a specially designated program directed at children, or the application has been determined to be targeted at children on a different operating system;

automatically determining, based on at least one of the conditions values being satisfied, that the application targets children.

18. The method of claim 17, wherein receiving information further comprising:

receiving one or more search terms;

discovering one or more applications based on the search terms; and receiving information associated with the one or more discovered applications.

19. The method of claim 18, wherein discovering one or more applications further comprising:

receiving an include criteria for one or more include search terms;

discovering one or more applications with the one or more include search terms in the application's title, description, or privacy policy; and receiving information associated with the one or more discovered applications that have the include search terms.

20. The method of claim 18, wherein discovering one or more applications further comprising:

receiving an exclude criteria for one or more exclude search terms;

discovering one or more applications with the one or more exclude search terms in the application's title, description, or privacy policy; and filtering out the one or more discovered applications with the one or more exclude search terms.

\* \* \* \* \*